US007975672B2

(12) United States Patent  (10) Patent No.: US 7,975,672 B2
Kang et al.  (45) Date of Patent: Jul. 12, 2011

(54) METHOD FOR CONTROLLING ENGINE INTAKE AIRFLOW

(75) Inventors: Jun-Mo Kang, Ann Arbor, MI (US); Chen-Fang Chang, Troy, MI (US); Jyh-Shin Chen, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 12/185,872

(22) Filed: Aug. 5, 2008

(65) Prior Publication Data
US 2009/0048761 A1    Feb. 19, 2009

Related U.S. Application Data (60) Provisional application No. 60/956,398, filed on Aug. 17, 2007.

(51) Int. Cl.
*F02M 1/00* (2006.01)
*F02D 13/04* (2006.01)
(52) U.S. Cl. .......................... 123/434; 123/321; 123/345
(58) Field of Classification Search ............. 123/406.23, 123/406.41, 406.44, 406.48, 321, 322, 345–348, 123/434, 435
See application file for complete search history.

(56) References Cited

U.S. PATENT DOCUMENTS

| | | | |
|---|---|---|---|
| 6,219,611 B1 * | 4/2001 | Russell | 701/105 |
| 6,250,283 B1 * | 6/2001 | Russell et al. | 123/361 |
| 6,257,214 B1 * | 7/2001 | Bidner et al. | 123/568.16 |
| 6,470,869 B1 * | 10/2002 | Russell et al. | 123/681 |
| 6,560,527 B1 * | 5/2003 | Russell et al. | 701/110 |
| 6,712,041 B1 * | 3/2004 | Russell et al. | 123/348 |
| 6,978,764 B1 * | 12/2005 | Russell et al. | 123/442 |
| 7,174,880 B2 * | 2/2007 | Henn et al. | 123/436 |
| 7,290,527 B2 * | 11/2007 | Russell et al. | 123/348 |
| 7,398,762 B2 * | 7/2008 | Russell et al. | 123/434 |
| 7,444,975 B2 * | 11/2008 | Kishi et al. | 123/184.55 |
| 2007/0186892 A1 * | 8/2007 | Kishi et al. | 123/184.55 |

FOREIGN PATENT DOCUMENTS
WO    WO-2004067938 A1    8/2004

OTHER PUBLICATIONS

"Improved Cylinder Air Charge Estimation for Transient Air Fuel Ratio Control", J.W. Grizzle, Proceedings of the American Control Conference, Baltimore, MD, Jun. 1994.

* cited by examiner

Primary Examiner — John T Kwon (57) ABSTRACT

An internal combustion engine includes a controllable throttle and controllable engine valves and is selectively operative in one of a plurality of combustion modes. An engine control method includes monitoring engine operation, determining a desired air flow, estimating a cylinder air charge, and estimating an intake air partial pressure. The throttle control device and engine valves are controlled based upon the intake air partial pressure and the cylinder air charge to achieve the desired air flow.

14 Claims, 6 Drawing Sheets

METHOD FOR CONTROLLING ENGINE INTAKE AIRFLOW

CROSS REFERENCE TO RELATED APPLICATIONS

This application claims the benefit of U.S. Provisional Application No. 60/956,398 filed on Aug. 17, 2007 which is hereby incorporated herein by reference.

TECHNICAL FIELD

This disclosure relates to controlling operation of internal combustion engines.

BACKGROUND

The statements in this section merely provide background information related to the present disclosure and may not constitute prior art.

Known spark-ignition (hereafter 'SI') engines introduce an air/fuel mixture into each cylinder which is compressed in a compression stroke and ignited by a spark plug. Known compression ignition engines inject pressurized fuel into a combustion cylinder near top-dead-center (hereafter 'TDC') of the compression stroke which ignites upon injection. Combustion for both gasoline engines and diesel engines involves premixed or diffusion flames controlled by fluid mechanics.

SI engines can operate in a variety of different combustion modes, including a homogeneous SI (hereafter 'SI-H') combustion mode or a stratified-charge SI (hereafter 'SI-SC') combustion mode. In a SI-H combustion mode, the cylinder charge is homogeneous in composition, temperature, and residual exhaust gases at timing of spark ignition. Fuel mass is uniformly distributed around the cylinder chamber at spark timing which occurs near the end of the compression stroke. The air/fuel ratio is preferably stoichiometric. In a SI-SC combustion mode, the air/fuel ratio can be lean of stoichiometry. The fuel mass should be stratified in the cylinder chamber with rich layers around the spark plug and leaner air/fuel areas further out. Fuel timing can be close to spark timing to prevent the air/fuel mixture from homogenizing into a uniformly disbursed mixture. The fuel pulse width can end as the spark event begins or substantially prior. Upon ignition, the rich layers burn quick and efficiently. As the combustion process proceeds into the leaner areas, the flame-front cools rapidly resulting in lower NOx emissions.

SI engines can be adapted to operate in a homogeneous-charge compression-ignition (hereafter 'HCCI') combustion mode, also referred to as controlled auto-ignition combustion, under predetermined speed/load operating conditions. The controlled auto-ignition combustion comprises a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. Controlled auto-ignition combustion is a distributed kinetically-controlled combustion process with the engine operating at a dilute air/fuel mixture, i.e., lean of an air/fuel stoichiometric point, with relatively low peak combustion temperatures, resulting in low NOx emissions. The homogeneous air/fuel mixture minimizes occurrences of rich zones that form smoke and particulate emissions.

In an engine configured for multiple combustion modes, switching between the different combustion modes can be advantageous. Different combustion modes in similar speed/load situations can have performance differences in engine stability, emissions, and fuel economy. Transitioning to a particular mode with the best performance in a particular situation is therefore preferable. Selecting which combustion mode to operate in is typically based upon which combustion mode performs better at a particular engine load and speed. When a change in speed and/or engine load warrants the switch to a different combustion mode, a transition strategy will be performed and the engine will transition to the different combustion mode.

As the number of combustion modes increases, transitioning between combustion modes and coordinating transitions can be complex. The engine control module must be capable of operating the engine in multiple combustion modes and switching among them seamlessly. Without a robust switching strategy a significant transient response could occur resulting in incomplete combustion and misfires, leading to torque disturbances and/or undesirable emissions.

SUMMARY

An internal combustion engine includes a controllable throttle and controllable engine valves and is selectively operative in one of a plurality of combustion modes. An engine control method includes monitoring engine operation, determining a desired air flow, estimating a cylinder air charge, and estimating an intake air partial pressure. The throttle control device and engine valves are controlled based upon the intake air partial pressure and the cylinder air charge to achieve the desired air flow.

BRIEF DESCRIPTION OF THE DRAWINGS

One or more embodiments will now be described, by way of example, with reference to the accompanying drawings, in which.

DETAILED DESCRIPTION

Figure 1:
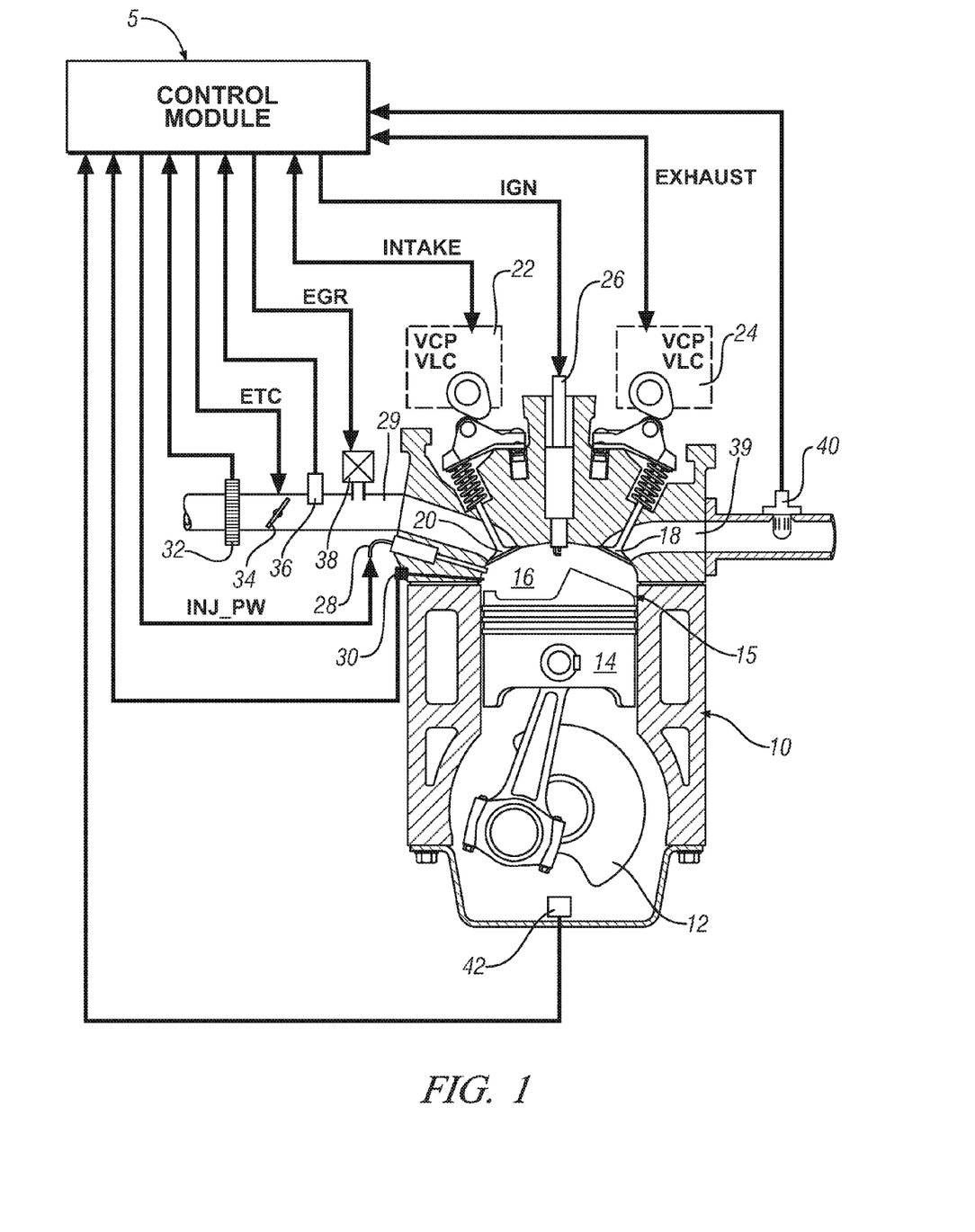
FIG. 1 is a schematic drawing of an engine system in accordance with the present disclosure.

Referring now to the drawings, wherein the depictions are for the purpose of illustrating certain exemplary embodiments only and not for the purpose of limiting the same, FIG. 1 schematically shows an internal combustion engine 10 and accompanying control module 5. The engine 10 is selectively operative in a controlled auto-ignition combustion mode, a homogeneous spark-ignition combustion mode, and a stratified-charge spark-ignition combustion mode.

The exemplary engine 10 comprises a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which their linear reciprocating motion is translated to rotational motion. An air intake system provides intake air to an intake manifold 29 which directs and distributes air into an intake runner to each combustion chamber 16. The air intake system comprises airflow ductwork and devices for monitoring and controlling the air flow. The air intake devices preferably include a mass airflow sensor 32 for monitoring mass airflow and intake air temperature. A throttle valve 34 preferably comprises an electronically controlled device which controls air flow to the engine 10 in response to a control signal (hereafter 'ETC') from the control module 5. A pressure sensor 36 in the manifold is adapted to monitor manifold absolute pressure and barometric pressure. An external flow passage recirculates exhaust gases from engine exhaust to the intake manifold, having a flow control valve, referred to as an exhaust gas recirculation ('EGR') valve 38. The control module 5 is operative to control mass flow of exhaust gas to the intake manifold 29 by controlling opening of the EGR valve 38.

Air flow from the intake manifold 29 into each of the combustion chambers 16 is controlled by one or more intake valves 20. Flow of combusted gases from each of the combustion chambers 16 to an exhaust manifold 39 is controlled by one or more exhaust valves 18. Openings and closings of the intake and exhaust valves 20 and 18 are preferably controlled with a dual camshaft (as depicted), the rotations of which are linked and indexed with rotation of the crankshaft 12. The engine 10 is equipped with devices for controlling valve lift of the intake valves and the exhaust valves, referred to as variable lift control (hereafter 'VLC') devices. The variable lift control devices are operative to control valve lift, or opening, to one of two distinct steps, e.g., a low-lift valve opening (about 4-6 mm) for low speed, low load engine operation, and a high-lift valve opening (about 8-10 mm) for high speed, high load engine operation. The engine is further equipped with devices for controlling phasing (i.e., relative timing) of opening and closing of the intake and exhaust valves 20 and 18, referred to as variable cam phasing (hereafter 'VCP'), to control phasing beyond that which is effected by the two-step VLC lift. There is a VCP/VLC system 22 for the intake valves 20 and a VCP/VLC system 24 for the engine exhaust valves 18. The VCP/VLC systems 22 and 24 are controlled by the control module 5, and provide signal feedback to the control module 5 for example through camshaft rotation position sensors for the intake camshaft (not shown) and the exhaust camshaft (not shown). When the engine 10 is operating in the HCCI combustion mode with an exhaust recompression valve strategy, the low lift operation is preferably used. When the engine is operating in the homogeneous spark-ignition combustion mode, the high lift operation is preferably used.

The intake and exhaust VCP/VLC systems 22 and 24 have limited ranges of authority over which opening and closing of the intake and exhaust valves 18 and 20 can be controlled. VCP systems can have a range of phasing authority of about 60°-90° of camshaft rotation, thus permitting the control module 5 to advance or retard opening and closing of one of the intake and exhaust valves 20 and 18. The range of phasing authority is defined and limited by the hardware of the VCP and the control system which actuates the VCP. The intake and exhaust VCP/VLC systems 22 and 24 may be actuated using one of electro-hydraulic, hydraulic, and electric control force, controlled by the control module 5. Overlap of the intake and exhaust valves phasing may be measured in crank angles, where a positive valve overlap (hereafter 'PVO') refers to the period where both valves are open and negative valve overlap (hereafter 'NVO') refers to the period where both valves are closed. PVO occurs when both the intake and exhaust valves 20 and 18 are open between the exhaust stroke ending and the beginning of the intake stroke. NVO occurs when both intake and exhaust valves 20 and 18 are closed between the exhaust stroke ending and the beginning of intake stroke. When operating in the HCCI combustion mode, the intake and exhaust valves may have a NVO for an exhaust recompression strategy. In an SI-H combustion mode preferred engine operation is with a PVO.

The engine 10 includes a fuel injection system, comprising a plurality of high-pressure fuel injectors 28 each adapted to directly inject a mass of fuel into one of the combustion chambers 16, in response to a signal (hereafter 'INJ_PW') from the control module 5. The fuel injectors 28 are supplied pressurized fuel from a fuel distribution system (not shown).

The engine 10 includes a spark-ignition system by which spark energy is provided to a spark plug 26 for igniting or assisting in igniting cylinder charges in each of the combustion chambers 16 in response to a signal (hereafter 'IGN') from the control module 5. The spark plug 26 enhances the ignition timing control of the engine at certain conditions (e.g., during cold start and near a low load operation limit).

The engine 10 is equipped with various sensing devices for monitoring engine operation, including monitoring crankshaft rotational position, i.e., crank angle and speed. Sensing devices include a crankshaft rotational speed sensor ('crank sensor') 42, a combustion sensor 30 adapted to monitor combustion and an exhaust gas sensor 40 adapted to monitor exhaust gases, preferably a wide range air/fuel ratio sensor in this embodiment. The combustion sensor 30 comprises a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle. The combustion sensor 30 can also be monitored by the control module 5 to determine a mean-effective-pressure (hereafter 'IMEP') for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

The engine 10 is designed to operate un-throttled on gasoline or similar fuel blends in the controlled auto-ignition combustion mode over an extended range of engine speeds and loads. However, spark-ignition and throttle-controlled operation may be utilized under conditions not conducive to the controlled auto-ignition combustion mode and to obtain maximum engine power to meet an operator torque request with engine power defined by the engine speed and load. Widely available grades of gasoline and light ethanol blends thereof are preferred fuels; however, alternative liquid and gaseous fuels such as higher ethanol blends (e.g. E80, E85), neat ethanol (E99), neat methanol (M100), natural gas, hydrogen, biogas, various reformates, syngases, and others may be used.

The control module 5 executes algorithmic code stored therein to control the aforementioned actuators to control engine operation, including throttle position, spark timing, fuel injection mass and timing, intake and/or exhaust valve timing and phasing, and EGR valve position to control flow of recirculated exhaust gases. Valve timing and phasing includes NVO and lift of exhaust valve reopening in an exhaust re-breathing strategy. The control module 5 is adapted to receive input signals from an operator (e.g., a throttle pedal position and a brake pedal position) to determine an operator torque request and from the sensors indicating the engine speed and intake air temperature, and coolant temperature and other ambient conditions.

The control module 5 is preferably a general-purpose digital computer generally comprising a microprocessor or central processing unit, storage mediums comprising non-volatile memory including read only memory and electrically programmable read only memory, random access memory, a high speed clock, analog to digital and digital to analog circuitry, and input/output circuitry and devices and appropriate signal conditioning and buffer circuitry. The control module has a set of control algorithms, comprising resident program instructions and calibrations stored in the non-volatile memory. The algorithms are preferably executed during preset loop cycles. Algorithms are executed by the central processing unit and are operable to monitor inputs from the aforementioned sensing devices and execute control and diagnostic routines to control operation of the actuators, using preset calibrations. Loop cycles may be executed at regular intervals, for example each 3.125, 6.25, 12.5, 25 and 100 milliseconds during ongoing engine and vehicle operation. Alternatively, algorithms may be executed in response to occurrence of an event.

Figure 2:
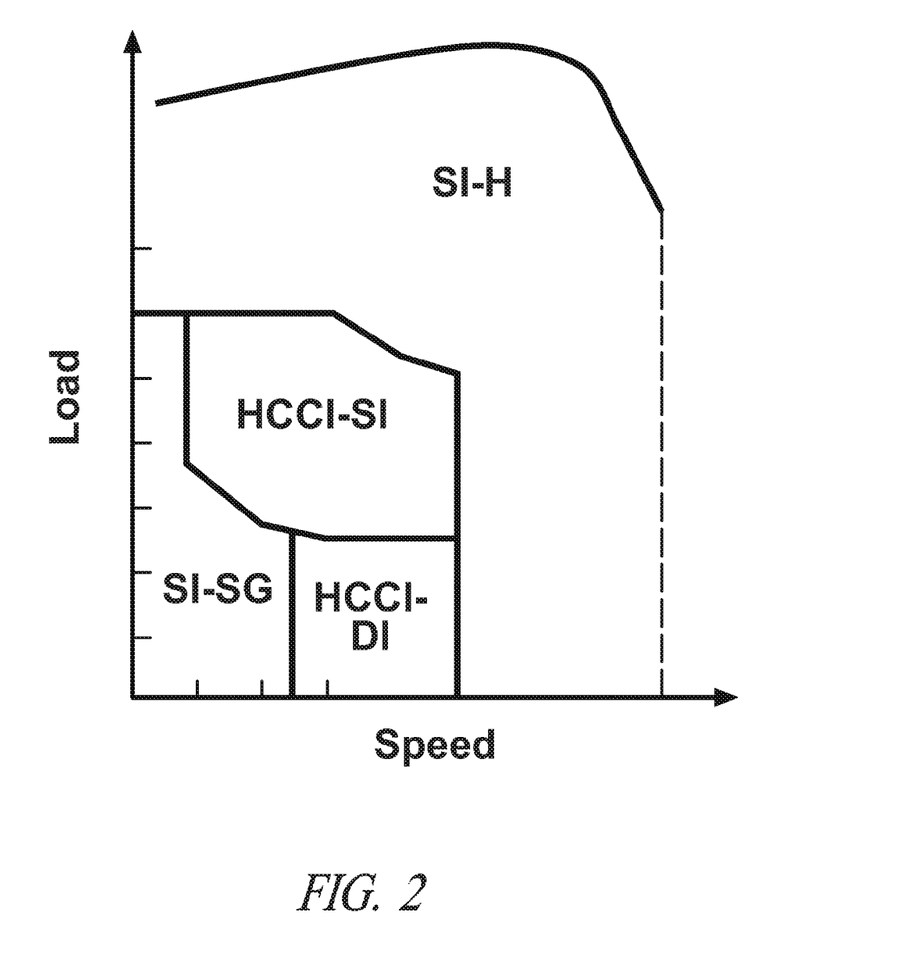
FIG. 2 is a data graph in accordance with the present disclosure.

FIG. 2 schematically depicts preferred operating ranges for the exemplary engine 10 in spark ignition and controlled auto-ignition combustion modes, based upon states of engine parameters, in this embodiment comprising speed and load which is derivable from engine parameters including the fuel flow and the intake manifold pressure. The engine combustion modes preferably comprise a spray-guided spark ignition ('SI-SG') combustion mode, a single injection controlled auto-ignition ('HCCI-SI') combustion mode, and double injection controlled auto-ignition ('HCCI-DI') combustion mode, and a homogeneous spark ignition ('SI-H') combustion mode. A preferred speed and load operating range for each of the combustion modes is based upon engine operating parameters, including combustion stability, fuel consumption, emissions, engine torque output, and others. Boundaries which define the preferred speed and load operating ranges to delineate operation in the aforementioned combustion modes are preferably precalibrated and stored in the control module 5.

The engine 10 is controlled to operate at a preferred operating point based upon an operator torque request and preferably comprises a speed/load operating point. The engine 10 is controlled to a preferred air-fuel ratio and the intake air flow is controlled to achieve the preferred air-fuel ratio based upon the preferred operating point and a selected preferred combustion mode. Position of the throttle valve 34 and lift and phasings of the intake and exhaust valves 20 and 18 are controlled using the VCP/VLC devices 22 and 24 to achieve an intake air flowrate based upon an estimated cylinder air charge, including during a transition between the spark ignition and controlled auto-ignition combustion modes. Air flow is controlled by adjusting the throttle valve 34 and the VCP/VLC devices 22 and 24 to control the phasing, timing, and lift profiles of the intake and exhaust valves 20 and 18. Operation in the two combustion modes requires different settings for the VCP/VLC devices 22 and 24 in terms of phasing and lift of the intake and exhaust valves 20 and 18 and the throttle valve 34 for throttle position. By way of example, the throttle valve 34 is preferably wide-open in the auto-ignition combustion mode with the engine 10 controlled at a lean air-fuel ratio, whereas the throttle valve 34 is controlled to regulate the air flow and the engine 10 is controlled to a stoichiometric air-fuel ratio in the spark-ignition combustion mode.

Figure 3:
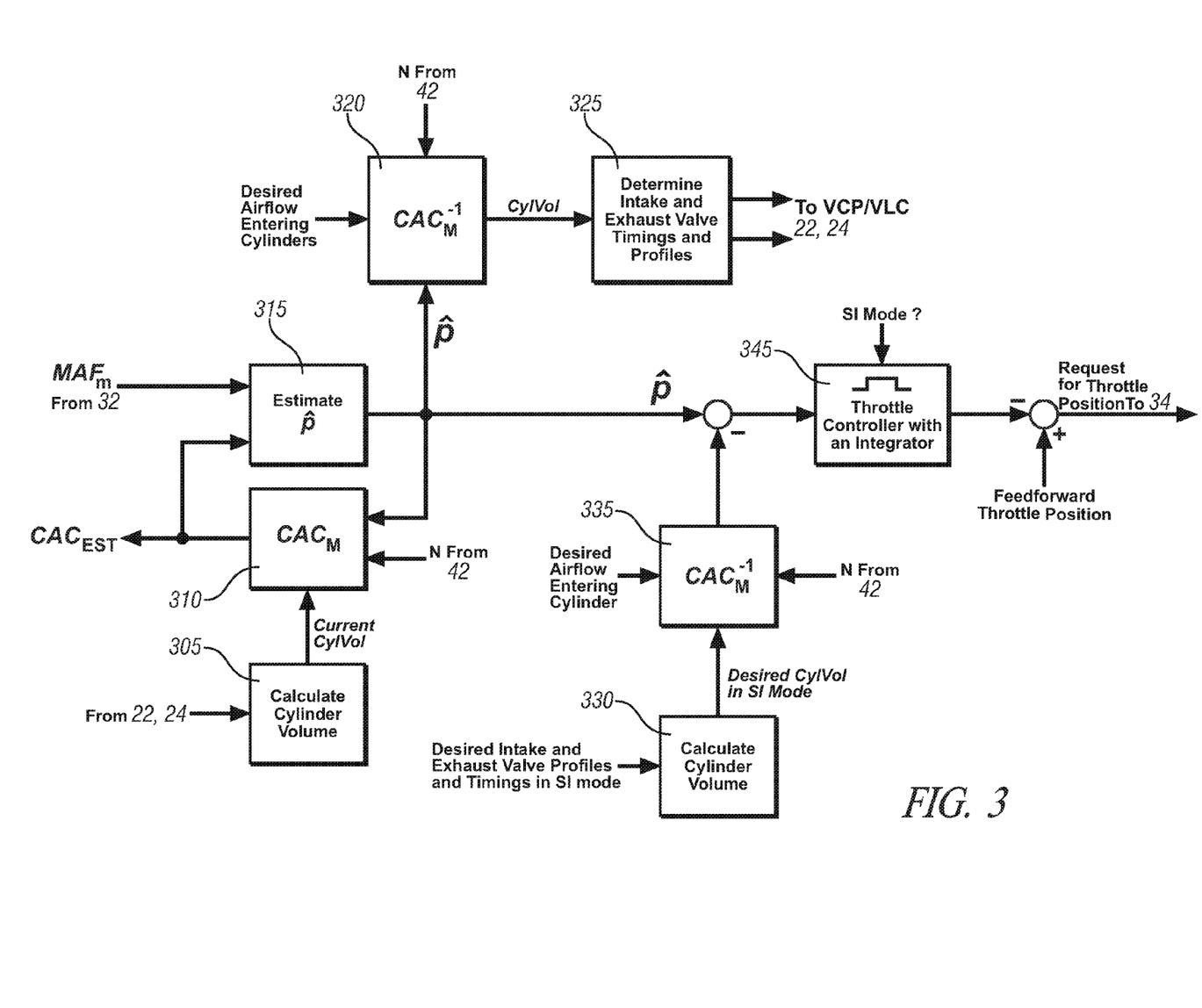
FIG. 3 is a schematic block diagram of a control scheme in accordance with the present disclosure.

FIG. 3 depicts a control strategy for operating the exemplary engine 10 described with reference to FIGS. 1 and 2, preferably executed in the control module 5 as algorithms and calibrations. The control strategy executes to control engine operation to achieve a desired air flow ('Desired Airflow Entering Cylinders') during ongoing engine operation in each of the combustion modes and during transitions between the combustion modes. The control strategy comprises estimating a cylinder air charge based upon engine operation in a first combustion mode including the preferred air/fuel ratio and the preferred engine operating point. An intake air partial pressure, which can be determined in the intake manifold 29 in one embodiment, can be estimated based upon the mass air flow and the estimated cylinder air charge. Phasings and lift of the intake and exhaust valves 20 and 18 and position of the throttle valve 34 are controlled in this embodiment using the throttle valve 34 and VCP/VLC devices 22 and 24 to achieve a desired intake air flow based upon the estimated intake air partial pressure and the estimated cylinder air charge, including during a transition from a first of the combustion modes to a second of the combustion modes.

The control strategy of the control module 5 includes a cylinder air charge estimator ('$CAC_M$') 310, which estimates air flow entering the cylinders 15. The cylinder air charge estimator 310 includes effects of operation of the VLC/VCP devices 22 and 24 on the intake air flow. An intake air partial pressure p due to a fresh air charge into the intake manifold 29 can be modeled by the following Eq. 1:

$$\frac{d}{dt}p = \frac{RT}{V}(MAF - CAC(CylVol, N, p))  \qquad [1]$$

wherein T is the intake manifold temperature, R is the gas constant, V is the volume of the intake manifold 29, MAF is the mass air flow entering through the throttle valve 34 measured by the mass air flow sensor 32, and CAC is the cylinder air charge, comprising the mass air flow entering one of the cylinders 15. The cylinder air charge can be determined based upon a cylinder air volume (CylVol), engine speed (N), and the intake air partial pressure p due to the fresh air charge. The cylinder air volume, i.e., the volumetric displacement, can be determined based upon the timings and profiles of the intake and exhaust valves 20 and 18, and is approximately equal to $V_{IVC} - V_{EVC}$ where $V_{IVC}$ and $V_{EVC}$ are the cylinder volumes at closings of the intake valve 20 and the exhaust valve 18, respectively. The cylinder volumes can be calculated at the closings of the intake valve and exhaust valve 20 and 18 based upon inputs from the crank sensor 42 and camshaft position sensors (not shown) that are elements of the VCP/VLC devices 22 and 24 in the embodiment. The cylinder volumes are calculated using known slider equations ('Cylinder Volume Calculation') (305).

The mass air flow entering through the throttle valve 34 is measured by the mass air flow sensor 32. Dynamics of the mass air flow sensor 32 can be approximated by a first order differential equation in Eq. 2:

$$\tau\frac{d}{dt}MAF_m + MAF_m = MAF \qquad [2]$$

wherein τ is the time constant of the mass air flow sensor 32 and $MAF_m$ is the measured mass air flow from the mass air flow sensor 32.

Combining Eqs. 1 and 2 and introducing a new parameter x yields Eq. 3:

$$x = p - \frac{RT}{V}\tau MAF_m \qquad [3]$$

The following equation is derived based upon equations [1]-[3] above:

$$\frac{d}{dt}x = \frac{RT}{V}\left(MAF_m - CAC\left(CylVol, N, x + \frac{RT}{V}\tau MAF_m\right)\right) \qquad [4]$$

The cylinder air charge is preferably determined using the cylinder air charge estimator 310. The cylinder air charge estimator 310 approximates the cylinder air charge used in Eq. 4 and estimates the air flow entering the cylinders 15 in the following Eqs. 5, 6, and 7:

$$\frac{d}{dt}\hat{x} = \frac{RT}{V}(MAF_m - CAC_{EST}) \qquad [5]$$

$$\hat{p} = \hat{x} + \frac{RT}{V}\tau MAF_m \qquad [6]$$

$$CAC_{EST} = CAC_M\left(CylVol, N, \hat{x} + \frac{RT}{V}\tau MAF_m\right) \qquad [7]$$

wherein $\hat{x}$ is an estimate of x, $CAC_{EST}$ comprises an estimate of the cylinder air charge entering the cylinders 15, $CAC_M$ is the model of mass air flow entering the cylinders 15, and $\hat{p}$ is the estimated intake air partial pressure in the intake manifold 29 due to the fresh air charge (315). In steady state operation, the estimated cylinder air charge $CAC_{EST}$ (or $CAC_M$) is equal to the cylinder air charge, or the measured mass air flow.

The control module 5 controls the throttle 34 and the intake and exhaust VLC/VCP devices 22 and 24 to achieve a desired cylinder air charge in this embodiment. The desired engine air flow is determined based upon an operator torque request and a predetermined air/fuel ratio for a current combustion mode. The control module 5 control air flow to drive the estimated cylinder air charge $CAC_{EST}$ to the desired cylinder air charge.

During the spark-ignition combustion mode, values for the desired valve timing and profile are predetermined, therefore, the desired cylinder air volume is also predetermined (330). Air flow is controlled based upon the estimate of the partial intake pressure $\hat{p}$. A desired partial intake pressure to achieve the desired air flow can be obtained by inverting the air flow model in Eq. 7 for any given engine speed (N) (335). The difference between the estimated partial pressure of the intake manifold 29 determined from Eqs. 5 and 6, and the desired partial intake pressure is used to determine throttle position (345). The throttle valve 34 is controlled to bring the estimate of the partial intake pressure to the desired value. Once the partial intake pressure is controlled to the desired value, the air flow achieves the desired value.

During the auto-ignited combustion mode, the throttle of the throttle valve 34 is kept fully open and the valve timings and profiles are determined to control the air flow. The estimate of the partial intake pressure $\hat{p}$ is calculated from the Eqs. 5 and 6 and the desired cylinder air volume is determined by inverting the air flow model in Eq. 7, given the engine speed ('N'), the estimate of the intake partial pressure $\hat{p}$, and the desired air charge (320). Once the cylinder air volume is controlled to the desired value, the air flow achieves the desired value. The phasing and lift of openings and closings of the intake and exhaust valves 20 and 18 that realize the desired cylinder air volume can be determined, as described hereinbelow based upon the desired cylinder air volume (325).

The desired cylinder air volume can be achieved using one of multiple methods. Preferably, while continuing engine operation in a single combustion mode, to achieve a desired cylinder air volume the control module 5 may change the phasing of the intake and exhaust valves 20 and 18 without changing the lift. For combustion mode transitions where lift position between the combustion modes is preferably different, the control module 5 preferably will coordinate lift timing and phasing to control air flow for continuous combustion.

Figure 4:
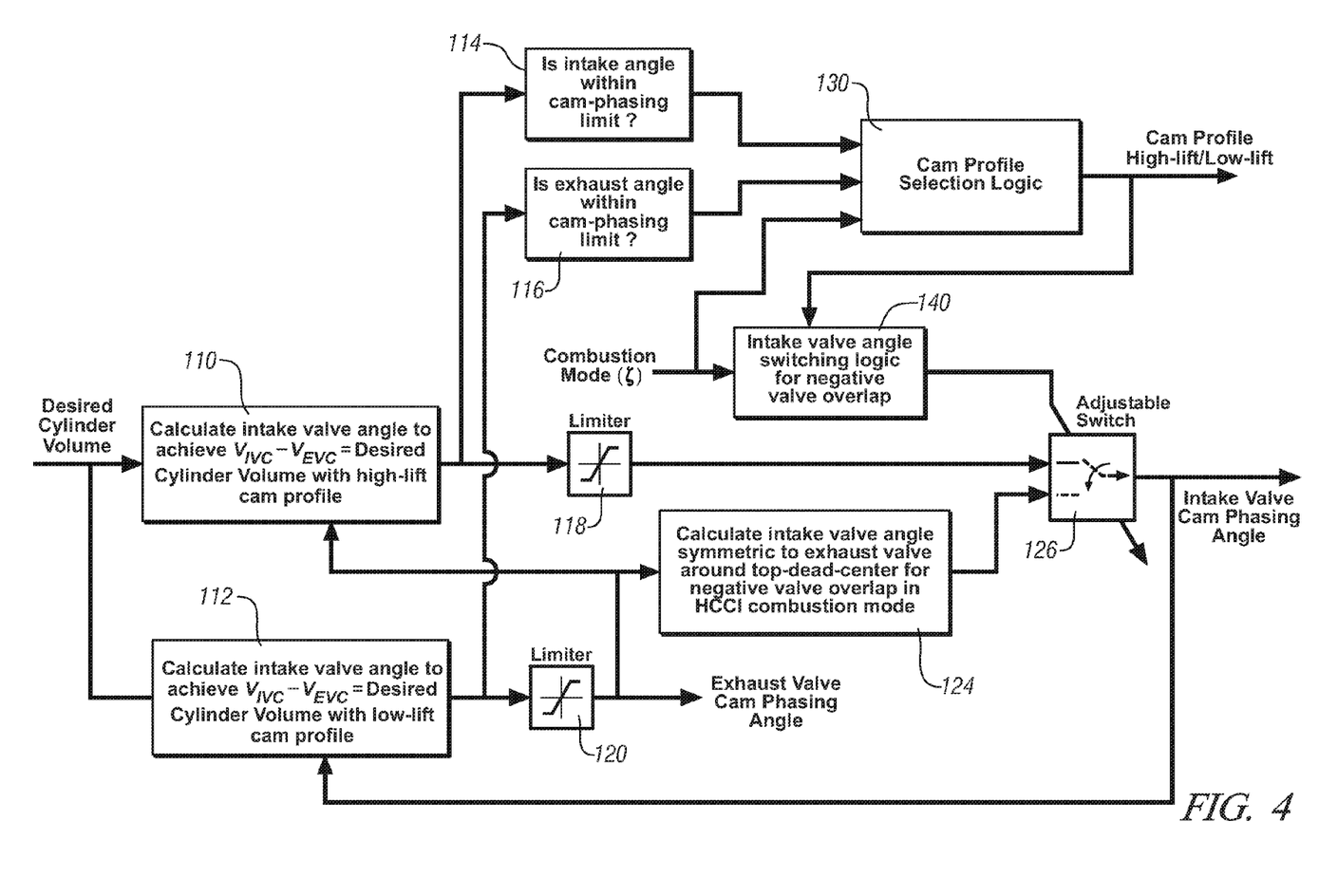
FIG. 4 is a schematic block diagram of a control scheme in accordance with the present disclosure.
Figure 5A:
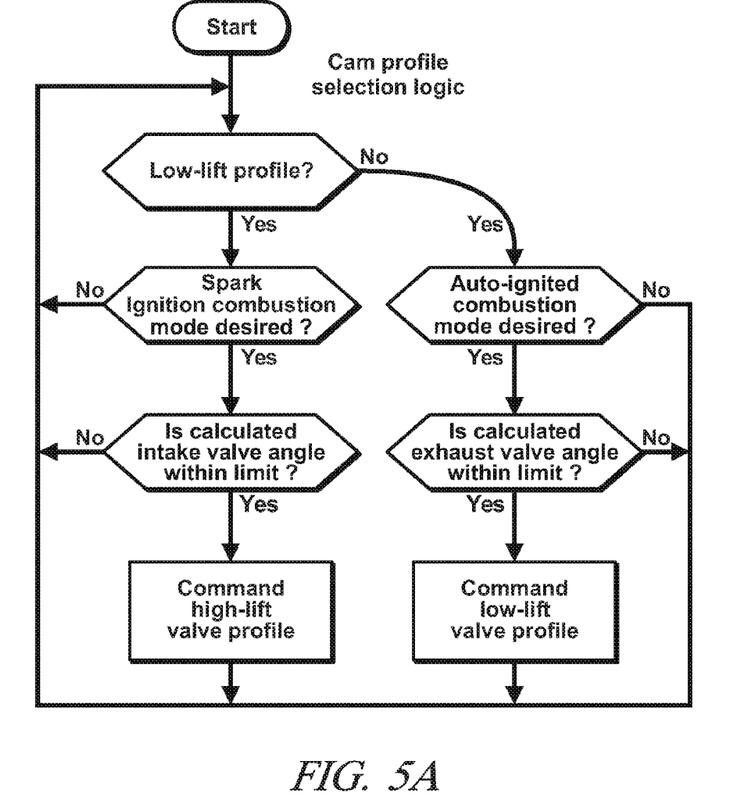
FIGS. 5A and 5B are schematic block diagrams of a control scheme in accordance with the present disclosure.
Figure 5B:
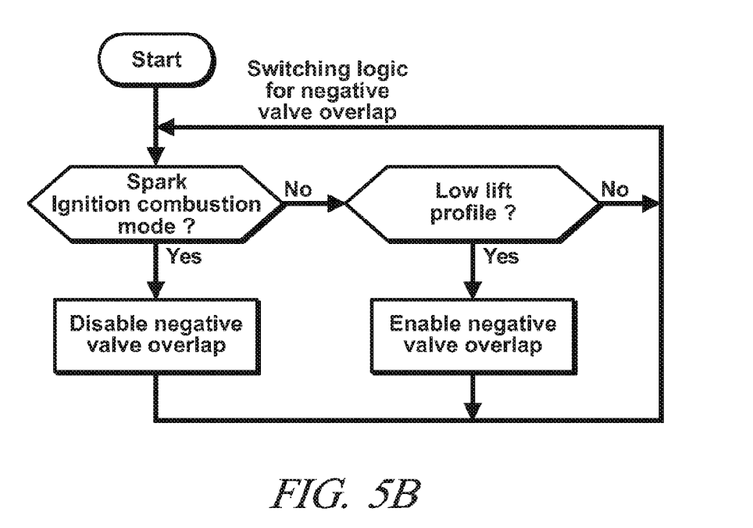

FIGS. 4 and 5A and 5B show a control scheme executed as one or more algorithms in the control module 5 illustrating a method for controlling the phasing and lift of the intake and exhaust valves 20 and 18. In one embodiment, the control scheme comprises controlling the VCP/VLC devices 22 and 24 to selectively operate at one of a first valve lift position and a second valve lift position. This includes controlling the VCP/VLC devices 22 and 24 to transition between engine operation at the low-lift engine valve open position and the high-lift engine valve open position.

The desired cylinder air volume for the desired engine air flow is determined when operating at the first valve lift position. A control scheme to control the engine valves to attain the desired cylinder air volume for the desired engine air flow when operating at the second valve lift position is determined, described with reference to the FIGS. 4, 5A, and 5B. The control scheme is executed and the engine 10 is transitioned to the second valve lift position when the cylinder air volume to operate at the second valve lift position is within a range of authority of the engine valves.

Openings and the closings of the intake and exhaust valves 20 and 18, including the VCP/VLC devices 22 and 24, are controlled during the transitions based upon differences between the current states for mass air flow, intake manifold pressure, and cylinder air volume, and, the mass air flow, the intake manifold pressure, and the desired cylinder air volume to operate the engine in the second combustion mode and meet the operator torque request. The control scheme determines desired states for mass air flow, intake manifold pressure, and the desired cylinder air volume to operate the engine in the second combustion mode. The desired states are determined based upon an operator torque request. Current states for mass air flow and intake manifold pressure are determined using the MAF sensor 32 and the MAP sensor 36, respectively.

In FIG. 4, $\zeta$ represents the combustion mode to which the system is commanded to transition, either 0 for the auto-ignited combustion mode, or 1 for the spark-ignited combustion mode in the embodiment. A command to transition between the auto-ignition combustion mode and the spark-ignited mode causes a transition of one or both of the VCP/VLC devices 22 and 24 between the low-lift valve position and the high-lift valve position.

As FIG. 4 shows, the desired cylinder air volume is input to each of blocks 110 and 112. In block 110, an intake valve angle is calculated which attains the desired cylinder air volume with the intake valve 20 controlled at the high-lift valve position. The calculated intake valve angle is output to a comparator 114, which determines whether the calculated intake valve angle exceeds the control authority of the intake VCP 22. An output of the comparator 114 is either 'yes' or 'no', indicating whether or not the control authority of the VCP 22 has been exceeded. The calculated intake valve angle is also input to a limiter 118, the output of which is an input to an algorithmic switch 126. The output of the switch 126 comprises the IVC phasing angle command signal to the intake VCP 22. Similarly, in block 112, an exhaust valve angle is calculated which attains the cylinder air volume with the exhaust VLC 24 at the low-lift valve position. The calculated exhaust valve angle is output to a comparator 116, which determines whether the calculated exhaust valve angle exceeds the control authority of the exhaust VCP 24. An output of the comparator 116 is either 'yes' or 'no'. The calculated exhaust valve angle is also input to a limiter 120, the output of which comprises the EVC phasing angle command signal to the exhaust VCP 24.

The outputs of blocks 114 and 116 and the combustion mode comprise the inputs to a cam profile selection logic (130), and detailed with reference to FIG. 5A. For the embodiment, the cam profile selection logic commands operation from the low-lift position to the high-lift position preferably when the SI combustion mode has been commanded ($\zeta$=1), and the intake valve angle is within of the control authority of the intake VCP 22. Similarly, the cam profile selection logic commands operation from the high-lift position to the low-lift position only when the controlled auto-ignition combustion mode has been commanded ($\zeta$=0), and the exhaust valve angle is within the control authority of the exhaust VCP 24.

The output of the cam profile selection logic 130 is also input to an intake valve switching logic for negative valve overlap ('NVO'), at 140. This operation, at 140, is depicted with reference to FIG. 5B, wherein NVO is commanded only when the controlled auto-ignition combustion mode has been commanded ($\zeta$=0) and the low-lift valve position has been reached.

In NVO operation, an intake valve opening angle that is symmetric around piston top-dead-center ('TDC') to the exhaust valve angle is calculated (124), based upon the limited commanded exhaust valve angle output. This intake valve opening angle is input to the switch device 126.

The switch device 126 comprises an algorithmic device which has inputs for the intake valve closing angle; one input comprises the IVC angle from 118, and the other input comprises the IVC angle, preferably symmetric around top-dead-center with the exhaust valve opening angle when operating in the low-lift, HCCI operation. The switch 114 is controlled based on the decision from the intake valve switching logic 140, to provide a linear (i.e., non-discrete) transition in IVC angle between the two inputs previously described, to provide a control output comprising the commanded angle to the intake VCP 22.

The control scheme uses a combination of valve lift position and the cam phasing position to vary the engine air flow, which is proportional to the cylinder air volume. Corresponding to the respective combustion mode, the two-step valve lift system is commanded to shift from a first valve lift position to a second valve lift position. During the transition, cylinder air volume corresponding to the mass of the desired fresh air charge is determined. Cylinder air volume and hence the fresh air charge is predominantly controlled by the exhaust VCP/VLC system 24 when the two-step valve lift system is in the low lift position, with the intake VCP/VLC system 22 having minimal, or ancillary influence. The cylinder air volume and hence the fresh air charge is predominantly controlled by the intake VCP/VLC system 22 when in the high lift valve position, with the exhaust VCP/VLC system 24 having minimal, or ancillary influence.

Thus, air flow is controlled by the position of the intake VCP/VLC system 22 to attain the desired cylinder air volume calculated with the two-step valve lift system in the high valve lift position. The exhaust VCP/VLC system 24 position to attain the desired cylinder air volume is calculated with the two-step valve lift system in the low valve lift position. When a transition between the two combustion modes is commanded, the camshaft for the predominant valve (intake or exhaust, depending on the current valve lift position) is controlled to the desired cam phasing position to attain the desired cylinder air volume, as described above, and thus air flow, when the VCP position is within its control authority. Prior to the cam phasing position going beyond its control authority, the two-step valve lift system is preferably shifted to the second valve lift position and the other cam assumes the predominant role of controlling the air flow.

The embodiment described hereinabove comprises an engine having a controllable two-step valve lift system and a variable cam phasing system operative to control closings of intake and exhaust valves. Depending on the combination of the valve lift position and the cam phasing positions, the amount of engine air flow varies and is proportional to a cylinder air volume that is the difference between the cylinder volumes at intake valve closings and exhaust valve closings.

The method comprises monitoring engine operation and an operator torque request. A transition between the spark-ignition combustion mode and the auto-ignition combustion mode based upon the engine operation is commanded. Corresponding to the respective combustion mode, the two-step valve lift system of the intake and exhaust VCP/VLC systems 22 and 24 commanded to shift from a first valve lift position to a second valve lift position. During the combustion mode transition, the desired value of the cylinder air volume which corresponds to the amount of the desired fresh air charge is determined. The air flow is predominantly controlled by the exhaust cam phasing when the two-step valve lift system is in the low lift position and by the intake cam phasing position when in the high lift position.

To control the air flow, the intake cam phasing positions necessary to achieve the desired cylinder air volume are calculated with the two-step valve lift system in the high valve lift position, while the exhaust cam phasing positions necessary to achieve the desired cylinder air volume are calculated with the two-step valve lift system in the low valve lift position. When a transition between the two combustion modes is commanded, the predominant cam (intake or exhaust, depending on the current valve lift position) is controlled to the desired cam phasing position that attains the desired cylinder air volume (thus air flow). When the cam phasing position is within its maximum authority and sufficiently close to the desired cam phasing position, the two-step valve lift system is shifted to the second valve lift position and the other cam assumes the dominant role of controlling the air flow.

Figure 6:
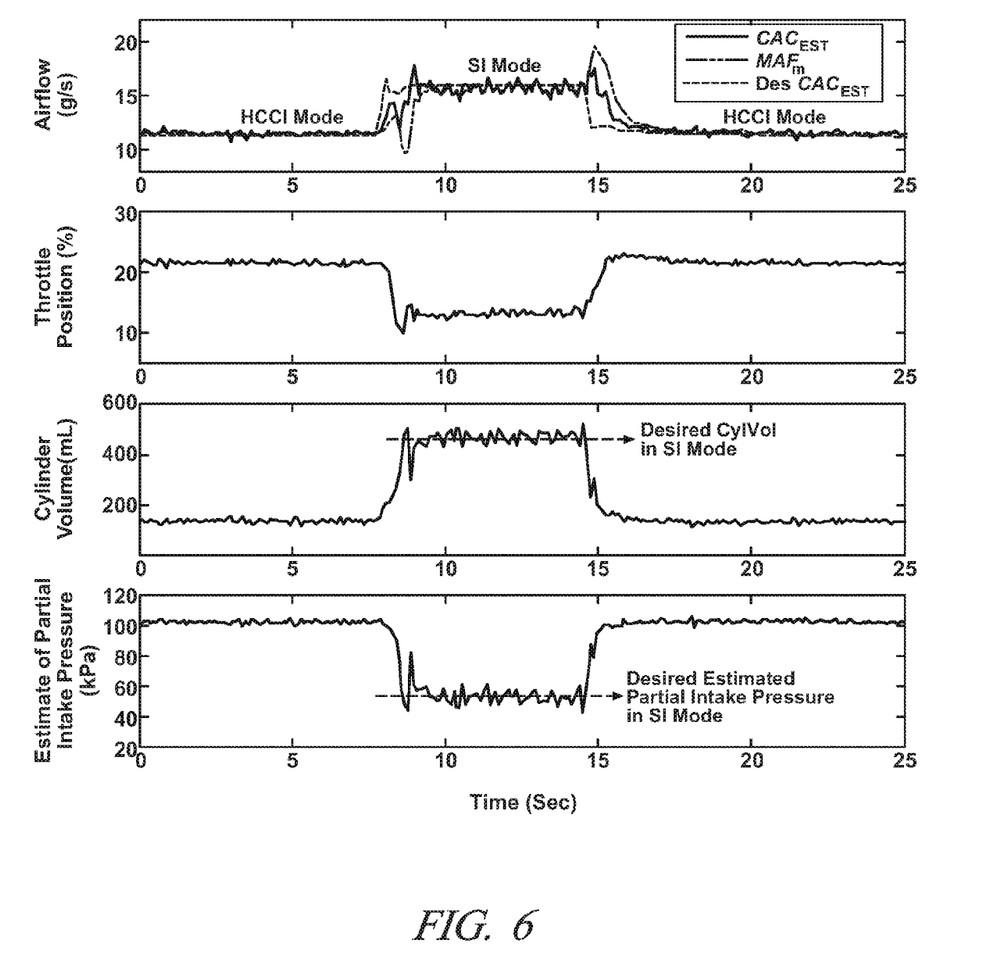
FIG. 6 is a data graph in accordance with the present disclosure.

FIG. 6 depicts experimental results for the system described hereinabove, with the control module 5 implemented and tested with the exemplary HCCI engine with the intake and exhaust VLC/VCP systems 22 and 24 comprising two-step valve lift systems. The engine speed was maintained constant at 2000 rpm, and the fueling rate transitioned from a low-load condition operating in the HCCI mode to a high-load condition operating in the SI mode, and then to the low-load condition operating in the HCCI mode. During the combustion mode transitions, the intake and exhaust valve timings and profiles were changed to achieve a desired cylinder air volume. FIG. 6 show engine airflow, throttle position, cylinder volume and estimated partial intake pressure for engine operation in the HCCI mode and the SI mode. The airflow data includes measured airflow ('$MAF_m$') estimated cylinder air charge ('$CAC_{EST}$') and a desired estimated cylinder air charge ('Des $CAC_{EST}$'). The cylinder volume includes a desired cylinder volume in the SI mode ('Desired CylVol in SI Mode'). The estimate of partial intake pressure includes a desired estimated partial intake pressure in SI mode. The experimental results in FIG. 6 indicate that the estimated cylinder air charge entering cylinders follows the desired estimated cylinder air charge trajectory well during the combustion mode transitions. The estimated partial intake pressure was controlled to the desired value using the throttle while the cylinder air volume converged to the desired cylinder air volume when the combustion mode is switched from HCCI mode to SI mode.

Alternative embodiments comprise other internal combustion engines having controllable multi-step valve opening control, including those employing multi-step valve openings and/or variable cam phasing for only the intake valves or the exhaust valves.

Further embodiments comprise multi-step lift systems in transitions between any two of the steps. Further embodiments comprise camless valve actuation systems transitioning between low-lift openings and high-lift openings. The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling an internal combustion engine including a controllable throttle and controllable engine valves, the engine selectively operative in one of a plurality of combustion modes, comprising:
   monitoring engine operation including monitoring cylinder air volume and engine speed;
   determining a desired air flow;
   estimating a cylinder air charge based upon the monitored cylinder air volume, the engine speed, and an intake air partial pressure;
   estimating the intake air partial pressure based upon the estimated cylinder air charge;
   controlling the throttle and the engine valves based upon the intake air partial pressure and the cylinder air charge to achieve the desired air flow;
   transitioning from a spark-ignition combustion mode to an auto-ignition combustion mode; and
   determining a desired cylinder air volume during the transition based upon the desired air flow and the estimated intake air partial pressure.

2. The method of claim 1, further comprising:
   controlling phasing and lift of the engine valves and controlling position of the throttle based upon the desired cylinder air volume.

3. The method of claim 1, wherein monitoring engine operation comprises monitoring intake air flow.

4. The method of claim 1, further comprising controlling position of the throttle to a wide open throttle position.

5. A method for controlling an internal combustion engine including a controllable throttle and controllable engine valves, the engine selectively operative in one of a plurality of combustion modes, comprising:
   monitoring engine operation including monitoring cylinder air volume and engine speed;
   determining a desired air flow;
   estimating a cylinder air charge based upon the monitored cylinder air volume, the engine speed, and an intake air partial pressure;
   estimating the intake air partial pressure based upon the estimated cylinder air charge;
   controlling the throttle and the engine valves based upon the intake air partial pressure and the cylinder air charge to achieve the desired air flow;
   transitioning from an auto-ignition combustion mode to a spark-ignition combustion mode;
   determining a desired cylinder air volume during the transition based upon phasings of the engine valves; and
   determining a desired intake air partial pressure based upon the desired air flow.

6. The method of claim 5, wherein monitoring engine operation comprises monitoring intake air flow.

7. The method of claim 5, further comprising:
   determining a difference between the estimated intake air partial pressure and the desired intake air partial pressure; and
   controlling position of the throttle based upon said difference.

8. A method for controlling an internal combustion engine including a controllable throttle, controllable engine valve cam phasers, and controllable engine valve lift devices, the engine selectively operative in one of a plurality of combustion modes, comprising:
   monitoring engine operation including monitoring cylinder air volume and engine speed;
   determining a desired air flow;
   estimating a cylinder air charge based upon the monitored cylinder air volume, the monitored engine speed, and an intake air partial pressure;
   estimating the intake air partial pressure based upon the estimated cylinder air charge;
   selectively controlling phase and lift of the engine valve cam phasers and the engine valve lift devices to effect air flow into a cylinder of the engine based upon the estimated cylinder air charge and the estimated intake air partial pressure;
   transitioning from a spark-ignition combustion mode to an auto-ignition combustion mode; and
   determining a desired cylinder air volume during the transition based upon the desired air flow and the estimated intake air partial pressure.

9. The method of claim 8, further comprising selectively controlling the phase and lift of the engine valve cam phasers and the engine valve lift devices and the engine throttle based upon the desired cylinder air volume.

10. The method of claim 8, wherein monitoring engine operation comprises monitoring intake air flow.

11. The method of claim 8, further comprising controlling the throttle to a wide open position.

12. A method for controlling an internal combustion engine including a controllable throttle, controllable engine valve cam phasers, and controllable engine valve lift devices, the engine selectively operative in one of a plurality of combustion modes, comprising:
   monitoring engine operation including monitoring cylinder air volume and engine speed;
   determining a desired air flow;
   estimating a cylinder air charge based upon the monitored cylinder air volume, the monitored engine speed, and an intake air partial pressure;
   estimating the intake air partial pressure based upon the estimated cylinder air charge;

selectively controlling phase and lift of the engine valve cam phasers and lift devices to effect air flow into a cylinder of the engine based upon the estimated cylinder air charge and the estimated intake air partial pressure;

transitioning from an auto-ignition combustion mode to a spark-ignition combustion mode;

determining a desired cylinder air volume during the transition based upon the phase of the engine valve cam phasers; and determining a desired intake air partial pressure based upon the desired air flow.

13. The method of claim 12, wherein monitoring engine operation comprises:
  monitoring intake air flow.

14. The method of claim 12, further comprising:
  determining a difference between the estimated intake air partial pressure and the desired intake air partial pressure; and
  controlling a position of the throttle based upon said difference.

* * * * *